(12) United States Patent
Lim et al.

(10) Patent No.: US 12,703,374 B2
(45) Date of Patent: Aug. 11, 2026

(54) VEHICLE CONTROL APPARATUS, SYSTEM HAVING THE SAME AND METHOD THEREOF

(71) Applicants: Hyundai Motor Company, Seoul (KR); Kia Corporation, Seoul (KR); HYUNDAI AUTOEVER Corp., Seoul (KR)

(72) Inventors: Hong Yeol Lim, Incheon (KR); Kyung Taek Kim, Anyang-si (KR)

(73) Assignees: Hyundai Motor Company, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 306 days.

(21) Appl. No.: 18/142,141

(22) Filed: May 2, 2023

(65) Prior Publication Data

US 2024/0166219 A1 May 23, 2024

(30) Foreign Application Priority Data

Nov. 17, 2022 (KR) ........................ 10-2022-0154569

(51) Int. Cl.

| | |
|---|---|
| ***B60W 50/029*** | (2012.01) |
| ***B60W 50/02*** | (2012.01) |
| ***B60W 60/00*** | (2020.01) |
| ***H04L 9/40*** | (2022.01) |

(52) U.S. Cl.
CPC ...... *B60W 50/029* (2013.01); *B60W 50/0205* (2013.01); *B60W 60/0015* (2020.02); *H04L 63/00* (2013.01); *B60W 2050/0215* (2013.01); *B60W 2556/50* (2020.02)

(58) Field of Classification Search
CPC ........... B60W 50/029; B60W 50/0205; B60W 60/0015; B60W 2050/0215; B60W 2556/50; B60W 50/0225; B60W 60/001; B60W 2050/0292; B60W 2556/45; B60W 2756/10; H04L 63/00; H04W 4/40; H04W 12/03
See application file for complete search history.

(56) References Cited

U.S. PATENT DOCUMENTS

| | | | | |
|---|---|---|---|---|
| 10,331,128 | B1 * | 6/2019 | Hansel | H04L 9/30 |
| 2017/0072967 | A1 * | 3/2017 | Fendt | B60W 50/0225 |
| 2017/0351261 | A1 * | 12/2017 | Levinson | G01S 7/497 |
| 2018/0336297 | A1 * | 11/2018 | Sun | G01M 17/00 |
| 2019/0113916 | A1 * | 4/2019 | Guo | A61B 5/6893 |
| 2020/0156651 | A1 * | 5/2020 | Golov | G01S 13/862 |
| 2020/0183411 | A1 * | 6/2020 | Oba | B60W 60/0057 |

(Continued)

*Primary Examiner* — Christopher George Fees
(74) *Attorney, Agent, or Firm* — Banner & Witcoff, Ltd.

(57) ABSTRACT

A vehicle control apparatus includes a sensor device including a plurality of sensors, a failure determination device that monitors the plurality of sensors at preset periods, identifies a failed sensor among the plurality of sensors, and determines transmission data to be transmitted to a server using faulty data obtained by the failed sensor, a communication device that transmits the transmission data to the server and receives virtual data generated by the server in correspondence with the transmission data from the server, and an autonomous driving controller that performs autonomous driving control for a host vehicle using at least one of the virtual data, the transmission data, or any combination thereof.

20 Claims, 10 Drawing Sheets

(56) References Cited

U.S. PATENT DOCUMENTS

| | | | | |
|---|---|---|---|---|
| 2020/0339151 | A1* | 10/2020 | Batts | B60W 60/00186 |
| 2021/0163021 | A1* | 6/2021 | Frazzoli | H04W 4/48 |
| 2021/0327173 | A1* | 10/2021 | Park | G05D 1/0011 |
| 2021/0334151 | A1* | 10/2021 | Hayes | G06F 11/2028 |
| 2022/0024493 | A1* | 1/2022 | Golov | G01S 13/867 |
| 2022/0048533 | A1* | 2/2022 | Ödblom | G06F 11/3698 |
| 2022/0126869 | A1* | 4/2022 | Wang | B60W 60/0027 |

* cited by examiner

SERVER 200

CONTROL INPUT/OUTPUT DEVICE 210

VEHICLE MONITORING DEVICE 220

VIRTUAL DATA MODELING DEVICE 230

FIG.2

VEHICLE CONTROL APPARATUS, SYSTEM HAVING THE SAME AND METHOD THEREOF

CROSS-REFERENCE TO RELATED APPLICATION

This application claims the benefit of priority to Korean Patent Application No. 10-2022-0154569, filed in the Korean Intellectual Property Office on Nov. 17, 2022, the entire contents of which are incorporated herein by reference.

TECHNICAL FIELD

The present disclosure relates to a vehicle control apparatus, a system including the same, and a method therefor, and more particularly, a technology for receiving virtual data for autonomous driving from a server and continuously controlling the driving of a host vehicle when a failure state of at least one of a plurality of sensors included in the host vehicle is identified.

BACKGROUND

With the development of technology, an autonomous driving system for a vehicle is gradually developing. A vehicle may obtain and process a variety of data for autonomous driving using a sensor device including a plurality of sensors.

For example, the vehicle may identify the external and/or internal conditions of the vehicle using at least one of a camera, a radar device, a light detection and ranging (LiDAR) device, or any combination thereof, and execute autonomous driving control that enables safer driving of the vehicle based on a result of the identification.

However, the vehicle may be in danger of a serious accident even when only one of the plurality of sensors has failed. For example, when at least one sensor configured to collect (or obtain) data on the speed or heading of the vehicle among the plurality of sensors is in a failure state, the accuracy of the data may be significantly reduced to cause a problem in driving of the vehicle.

To solve the above problem, when a specific sensor has failed, the autonomous driving system may be stopped or information about the failed sensor may be provided to the user in various ways. However, with this approach, the possibility of obstructing the flow of city traffic may be somewhat high, or other problems of deteriorating user convenience in terms of continuity of driving may occur.

SUMMARY

The following summary presents a simplified summary of certain features. The summary is not an extensive overview and is not intended to identify key or critical elements.

A vehicle control apparatus may comprise: a sensor device comprising a plurality of sensors; a failure determination device configured to monitor the plurality of sensors, identify a failed sensor among the plurality of sensors, and determine, based on faulty data obtained by the failed sensor, transmission data comprising sensing data associated with at least one sensor of the plurality of sensors; a communication device configured to transmit the transmission data to a server and receive, from the server, virtual data associated with the transmission data, wherein the virtual data is associated with the failed sensor; and an autonomous driving controller configured to perform autonomous driving control, for a vehicle, using at least one of: the virtual data or the transmission data.

The communication device may be configured to receive, from the server, guidance position information associated with the transmission data, and the guidance position information comprises information on a stop position of the vehicle.

The autonomous driving controller may be configured to perform the autonomous driving control, to allow the vehicle to stop in a stop area comprising the stop position of the vehicle, using at least one of: the virtual data, the transmission data, or the guidance position information.

The autonomous driving controller may be configured to encrypt vehicle information of the vehicle, wherein the vehicle information comprises at least one of: a vehicle number, a vehicle model, a driving position, a driving speed of the vehicle, a type of the failed sensor, sensor state information, sensor data information, or types of the plurality of sensors other than the failed sensor, and wherein the communication device is configured to transmit the encrypted vehicle information to the server.

The failure determination device may be configured to determine, based on a type of the failed sensor, at least a part of normal data obtained by at least one sensor other than the failed sensor among the plurality of sensors as the transmission data.

The failure determination device may be configured to: identify a related data list associated with the failed sensor; and determine, by using at least one data type included in the related data list, the at least a part of normal data as the transmission data.

The communication device may be configured to: establish a virtual sensor data channel for communicating the virtual data, and transmit the virtual data to a multiplexer through the virtual sensor data channel.

The autonomous driving controller may be configured to: generate autonomous driving data by processing an output of the multiplexer, wherein the output of the multiplexer comprises the virtual data transmitted through the virtual sensor data channel and normal data, and wherein the normal data is obtained using at least one sensor other than the failed sensor among the plurality of sensors, and perform, based on at least a part of the autonomous driving data, the autonomous driving control.

A vehicle control system may comprise: a vehicle control apparatus configured to monitor a plurality of sensors, identify a failed sensor among the plurality of sensors, and transmit transmission data, wherein the transmission data is determined based on faulty data obtained by the failed sensor, and wherein the transmission data comprises sensing data associated with at least one sensor of the plurality of sensors; and a computing device configured to: collect at least one of: vehicle information of a vehicle equipped with the vehicle control apparatus, sensor state information, or sensor data information; generate, based on at least a part of the collection and map data, virtual data, wherein the virtual data is associated with the failed sensor; and transmit, based on reception of the transmission data, the virtual data to the vehicle control apparatus.

The computing device may be configured to: receive, from at least one road side unit using the vehicle information, infrastructure information comprising at least one of: a driving lane of the vehicle, a driving position of the vehicle, or a nearby vehicle, determine a driving path of the vehicle using the infrastructure information and the at least one of: the vehicle information, the sensor state information, or the sensor data information, and generate, based on the determined driving path, the virtual data associated with the failed sensor.

The computing device may be configured to transmit and receive encrypted data to and from the vehicle based on a security system.

The computing device may be configured to: generate guidance position information comprising information about a stop position of the vehicle, and wherein the guidance position information is generated based on at least a part of the collection and the map data; and transmit, to the vehicle control apparatus, the virtual data and the guidance position information.

The sensor state information may comprise information on whether at least one of the plurality of sensors comprised in the vehicle is failed, and wherein the sensor data information comprises at least one sensor data obtained by at least one sensor other than the failed sensor among the plurality of sensors.

The vehicle control apparatus may be configured to: generate autonomous driving data by processing an output of a multiplexer, wherein the output of the multiplexer comprises the virtual data and normal data obtained using at least one sensor other than the failed sensor among the plurality of sensors; and perform, based on at least a part of the autonomous driving data, autonomous driving control for the vehicle.

The vehicle control apparatus may be configured to: encrypt the vehicle information of the vehicle, wherein the vehicle information comprises a vehicle number, a vehicle model, a driving position, a driving speed of the vehicle, a type of the failed sensor, the sensor state information, the sensor data information, or types of the plurality of sensors other than failed sensor; and transmit the encrypted vehicle information to the computing device.

A vehicle control method may comprise: monitoring, by a vehicle control apparatus, a plurality of sensors; identifying, by the vehicle control apparatus, a failed sensor among the plurality of sensors; determining, by the vehicle control apparatus and based on faulty data obtained by the failed sensor, transmission data comprising sensing data associated with at least one sensor of the plurality of sensors; transmitting, by the vehicle control apparatus, the transmission data to a computing device; receiving, by the vehicle control apparatus and from the computing device, virtual data associated with the transmission data, wherein the virtual data is associated with the failed sensor; and performing, by the vehicle control apparatus, autonomous driving control, for a vehicle, using at least one of: the virtual data or the transmission data.

The receiving the virtual data may comprise receiving, by a communication device, guidance position information comprising information on a stop position of the vehicle in response to transmission of the transmission data, and wherein the performing the autonomous driving control comprises performing, by an autonomous driving controller, the autonomous driving control, to allow the vehicle to stop in a stop area comprising the stop position of the vehicle, using at least one of: the virtual data, the transmission data, or the guidance position information.

The transmitting the transmission data may comprise: encrypting, by an autonomous driving controller, vehicle information of the vehicle, wherein the vehicle information comprises a vehicle number, a vehicle model, a driving position, a driving speed of the vehicle, a type of the failed sensor, sensor state information, sensor data information, or types of the plurality of sensors other than failed sensor, and transmitting, by a communication device, the encrypted vehicle information to the computing device.

The determining the transmission data may comprise: by using at least one data type comprised in a related data list associated with the failed sensor, determining, by a failure determination device, as the transmission data, at least a part of normal data obtained by at least one sensor other than the failed sensor among the plurality of sensors.

The receiving the virtual data may comprise: establishing, by a communication device, a virtual sensor data channel for communicating the virtual data, transferring the virtual data to a multiplexer through the virtual sensor data channel, and generating, by an autonomous driving controller, autonomous driving data by processing an output of the multiplexer, wherein the output of the multiplexer comprises the virtual data and normal data obtained using at least one sensor other than the failed sensor among the plurality of sensors, and wherein the performing the autonomous driving control comprises performing, by the autonomous driving controller and based on at least a part of the autonomous driving data, the autonomous driving control.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 2 is a block diagram showing components of a server;

In the description of the drawings, the same or similar reference numerals may be used for the same or similar components.

DETAILED DESCRIPTION

Figure 1:
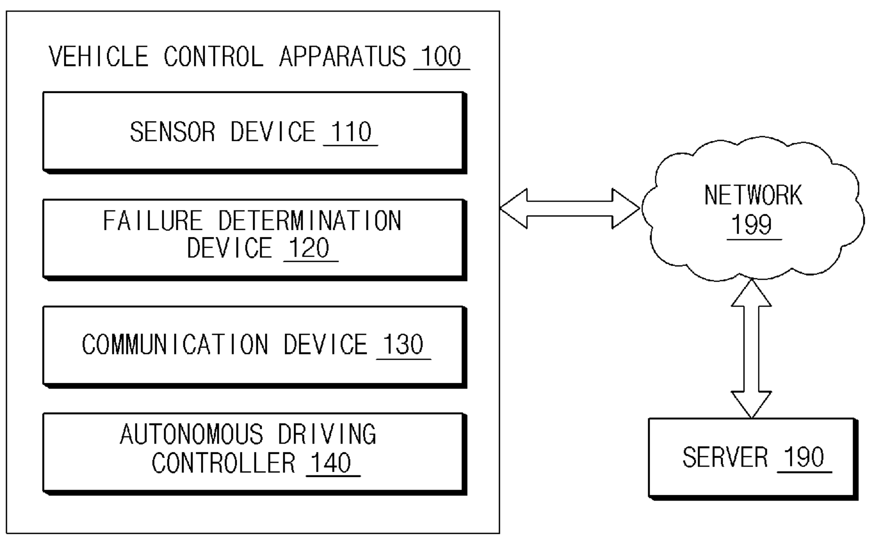
FIG. 1 is a block diagram illustrating components of a vehicle control device and a server.

Hereinafter, various examples of the present disclosure will be described in detail with reference to the exemplary drawings. In adding the reference numerals to the components of each drawing, it should be noted that the identical or equivalent component is designated by the identical numeral even when they are displayed on other drawings. Further, in describing the features of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

FIG. 1 is a block diagram illustrating components of a vehicle control device and a server.

A vehicle control apparatus 100 may include a sensor device 110, a failure determination device 120, a communication device 130, and an autonomous driving controller 140. The components of the vehicle control apparatus 100 shown in FIG. 1 are exemplary, and aspects of the present disclosure are not limited thereto. For example, the vehicle control apparatus 100 may further include components not shown in FIG. 1 (e.g., a virtual sensor data channel, a memory, and/or a sensor data selector). A description for additional configurations and specific operations of the vehicle control apparatus 100 may be replaced with descriptions of FIGS. 3 to 9 to be described later. At least some features of the failure determination device 120 may be implemented as part of the autonomous driving controller 140 and/or part of other controllers and/or processors.

The sensor device 110 may include a plurality of sensors. For example, the sensor device 110 may include at least one sensor of various types sensors which obtain information related to a host vehicle (e.g., position information, speed information, heading information, steering information, or any combination thereof). For example, the sensor may include a camera, a radar device, a Lidar device, or a combination thereof.

The failure determination device 120 may determine whether at least one of components of the vehicle has failed. For example, the failure determination device 120 may monitor a plurality of sensors included in the sensor device 110 (e.g., periodically, at preset periods, etc.). For example, the failure determination device 120 may identify a failed sensor among the plurality of sensors using a monitoring result. For example, sensing data obtained by the failed sensor may include faulty data. The faulty data may be sensing data obtained by a failed sensor, an abnormal sensor, etc., and the faulty data may include at least one of: inaccurate sensing data, unreliable sensing data, skewed sensing data, etc. For example, the failure determination device 120 may determine data to be transmitted to a server 190 using the faulty data. For example, the data to be transmitted to the server 190 determined by the failure determination device 120 may include transmission data.

The communication device 130 may establish a communication channel (e.g., a wireless communication channel) between the vehicle control apparatus 100 and the server 190 and support communication execution through the established communication channel. For example, the communication device 130 may include one or more communication processors that operate independently of the autonomous driving controller 140 (e.g., an application processor, a modem processor, etc.) and support direct (e.g., wired) communication or wireless communication.

For example, the communication device 130 may be a wireless communication module (e.g., a cellular communication module, a short-range wireless communication module, and/or a global navigation satellite system (GNSS) communication module), and/or a wired communication module (e.g., a local area network (LAN) communication module and/or a power line communication module). Among these communication modules, a corresponding communication module may communicate with the server 190 through a first network (e.g., a short-range communication network such as Bluetooth®, wireless fidelity (Wi-Fi®) direct, or infrared data association (IrDA)) or a second network (e.g., a legacy cellular network, a 5G network, a next-generation communication network, the Internet, and/or a computer network, such as LAN or WAN) included in a network 199. These various types of communication modules may be integrated into one component (e.g., a single chip) or implemented as a plurality of separate components (e.g., multiple chips). Also, the communication device 130 may be implemented as a single chip together with the autonomous driving controller 140.

For example, the communication device 130 may transmit and receive a variety of data based on communication with the server 190. For example, the communication device 130 may transmit transmission data determined by the failure determination device 120 to the server 190. For example, the communication device 130 may receive virtual data generated by the server 190 in correspondence with the transmission data from the server 190.

The autonomous driving controller 140 may perform autonomous driving control for the host vehicle. For example, the autonomous driving controller 140 may perform autonomous driving control using at least one of the virtual data, the transmission data, or a combination thereof.

Figure 2:
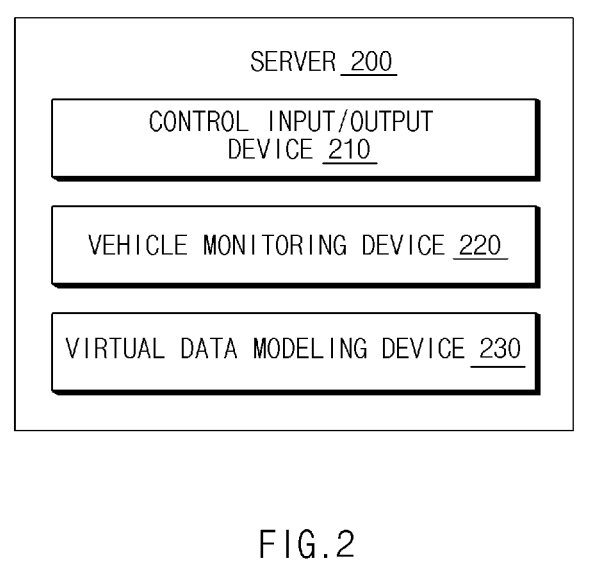

FIG. 2 is a block diagram showing components of a server.

A server 200 (e.g., the server 190 of FIG. 1) may include a control input/output device 210, a vehicle monitoring device 220, and a virtual data modeling device 230. The components of the server 200 shown in FIG. 2 are exemplary, and aspects of the present disclosure are not limited thereto. For example, the server 200 may further include components (e.g., memory) not shown in FIG. 2. A description for additional configurations and specific operations of the server 200 may be replaced with and/or supplemented by descriptions of FIGS. 3 to 9 to be described later.

The control input/output device 210 may transmit and receive a variety of data from the outside. For example, the control input/output device 210 may transmit and receive data to and from an external device (e.g., the vehicle control apparatus 100 of FIG. 1). For example, the control input/output device 210 may receive infrastructure information from at least one infrastructure device (e.g., a road side unit (RSU)). For example, the infrastructure information may include at least one of a driving lane of a vehicle associated with the infrastructure device, a driving location, a nearby vehicle, or any combination thereof.

The vehicle monitoring device 220 may collect information related to a specified vehicle and extract data necessary for modeling virtual data using at least a part of the collected data. For example, the vehicle monitoring device 220 may collect at least one of vehicle information, infrastructure information, sensor state information, sensor data information, or any combination thereof for the specified vehicle (e.g., host vehicle). For example, the vehicle monitoring device 220 may transmit at least a part of a collection result to the virtual data modeling device 230.

The virtual data modeling device 230 may generate virtual data based on at least one of the collection result, map data, or any combination thereof. For example, the virtual data may include information related to driving of the vehicle (e.g., at least one of position, speed, heading, steering, or any combination thereof). For example, the virtual data may include replacement data for data (e.g., faulty data) collected by at least one (e.g., a failed sensor, a sensor not working properly, etc.) of sensors included in the vehicle. For example, the virtual data modeling device 230 may model a driving path of a specified vehicle using at least a part of the collection result, and generate virtual data associated with at least one of sensors included in the specified vehicle based on the result of the modeling.

The server 200 may communicate with an external device (e.g., the vehicle control apparatus 100 of FIG. 1) based on a specified security algorithm. For example, the server 200 may transmit and receive data encrypted based on a predefined security system to and from a host vehicle equipped with a vehicle control apparatus. For example, at least a part of the above-described data transmission/reception between the vehicle control apparatus 100 and the server 200 may be performed while data is being encrypted based on the predefined security system.

Figure 3:
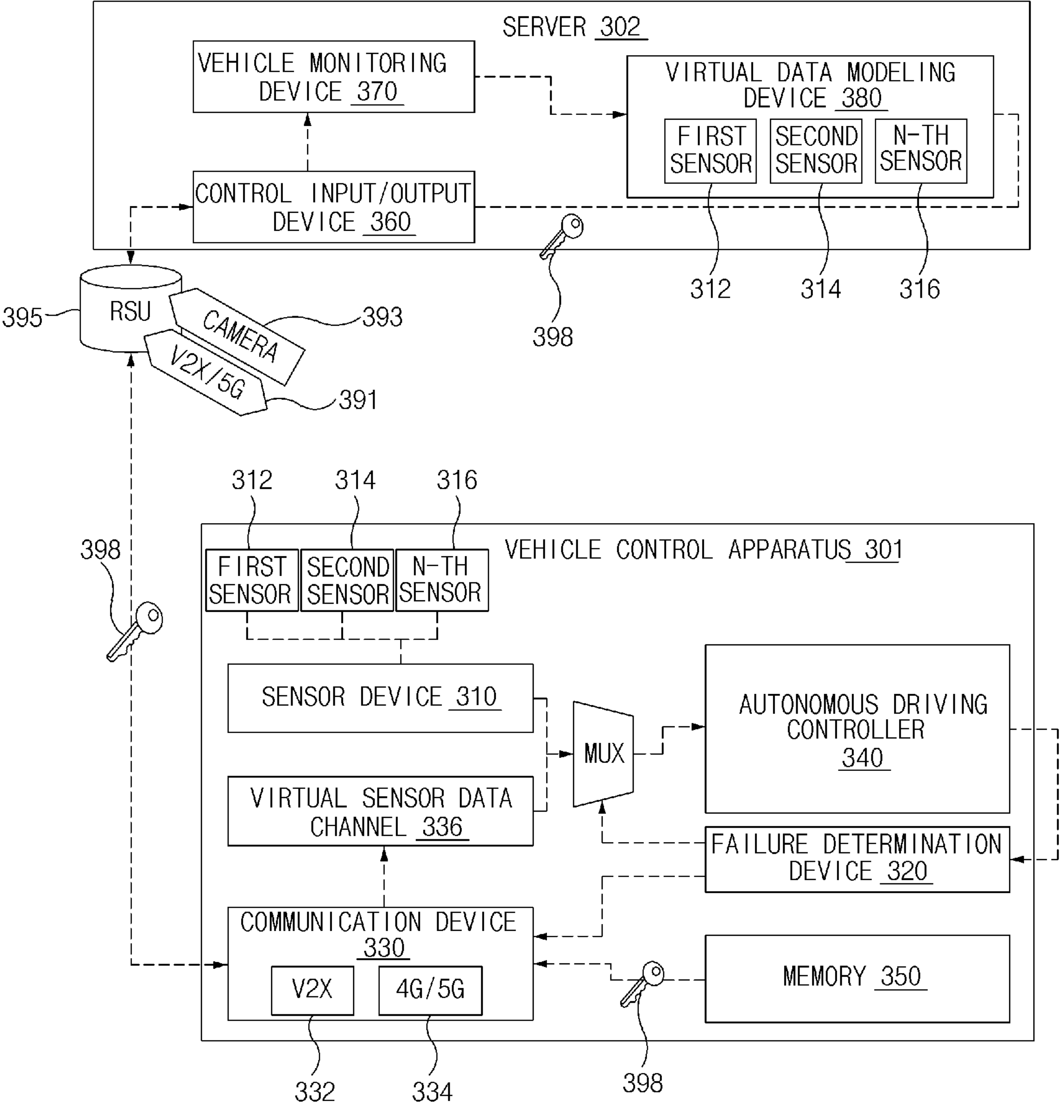
FIG. 3 is a conceptual diagram illustrating an operation between a vehicle control apparatus and a server.

FIG. 3 is a conceptual diagram illustrating an operation between a vehicle control apparatus and a server.

Referring to FIG. 3, a vehicle control apparatus 301 (e.g., the vehicle control apparatus 100 of FIG. 1) and a server 302 (e.g., the server 200 of FIG. 2) may transmit and receive a variety of data to and from each other.

The vehicle control apparatus 301 may obtain a variety of data through a sensor device 310 including a plurality of sensors 312, 314, and 316 (e.g., the sensor device 110 of FIG. 1). For example, the vehicle control apparatus 301 may obtain a variety of data through N sensors including a first sensor 312, a second sensor 314, and an N-th sensor 316.

The vehicle control apparatus 301 may identify a failed sensor among a plurality of sensors, for example, by using a failure determination device 320. For example, the vehicle control apparatus 301 may monitor the plurality of sensors (e.g., periodically, at preset periods, etc.) using the failure determination device 320 and identify a failed sensor among the plurality of sensors. For example, the failure determination device 320 may determine transmission data to be transmitted to the server 302 using data (e.g., faulty data) obtained by the failed sensor and/or obtained based on the failed sensor.

The vehicle control apparatus 301 may transmit the determined transmission data to the server 302. For example, the vehicle control apparatus 301 may transmit the transmission data to the server 302 through a communication device 330.

The server 302 may receive the transmission data transmitted from the vehicle control apparatus 301. For example, the server 302 may receive encrypted 398 transmission data from the vehicle control apparatus 301 using a control input/output device 360 (e.g., the control input/output device 210 of FIG. 2). For example, the server 302 may receive transmission data encrypted 398 and transmitted from the vehicle control apparatus 301 (e.g., through a road side unit (RSU) 395 or any other network node(s)).

The server 302 may collect information related to a specified vehicle using a vehicle monitoring device 370 (e.g., the vehicle monitoring device 220 of FIG. 2). For example, the server 302 may receive data collected (e.g., through the RSU 395 or any other network node(s)) based on communication between a plurality of cameras 393 and a wireless communication (e.g., a V2X/5G 391) device disposed on a road. For example, the specified vehicle may be a host vehicle including the vehicle control apparatus 301. For example, the vehicle monitoring device 370 may extract data that may be necessary for modeling virtual data using at least a part of the collected data. For example, the vehicle monitoring device 370 may collect at least one of vehicle information, infrastructure information, sensor state information, sensor data information, or any combination thereof for the specified vehicle (e.g., host vehicle). For example, the vehicle monitoring device 370 may transmit at least a part of a collection result to a virtual data modeling device 380.

The virtual data modeling device 380 (e.g., the virtual data modeling device 230 of FIG. 2) of the server 302 may generate virtual data based on at least one of a collection result, map data, or any combination thereof. For example, the map data may include map data stored in a memory (not shown) of the server 302 and related to a driving path of the specified vehicle. For example, the virtual data may include information related to driving of the vehicle (e.g., at least one of position, speed, heading, steering, or any combination thereof) For example, the virtual data may include replacement data for data (e.g., faulty data) collected by at least one (e.g., a failed sensor) of sensors included in the vehicle. For example, the virtual data modeling device 380 may model a driving path of a specified vehicle using at least a part of the collection result, and generate virtual data associated with at least one of sensors 312, 314 and 316 included in the specified vehicle based on the result of the modeling.

The server 302 may transmit the virtual data generated using the virtual data modeling device 380 to the vehicle control apparatus 301. For example, the server 302 may encrypt 398 the virtual data and transmit the virtual data to the vehicle control apparatus 301.

The vehicle control apparatus 301 may receive the virtual data transmitted from the server 302 using the communication device 330 (e.g., V2X 332 and 4G/5G 334). For example, the communication device 330 may transfer the virtual data to a virtual sensor data channel 336. For example, to receive the virtual data (e.g., when or before receiving the virtual data), the vehicle control apparatus 301 may establish the virtual sensor data channel 336 including a transmission and reception channel for the virtual data and transfer the virtual data to the virtual sensor data channel 336.

The vehicle control apparatus 301 may multiplex (MUX) at least one piece of data obtained through the sensor device 310 and virtual data transferred to the virtual sensor data channel 336. For example, the at least one piece of data obtained by the sensor device 310 may include normal data obtained by using at least one sensor other than a failed sensor. The virtual data may include replacement data of the faulty data obtained by the failed sensor. The virtual data may be calibration data or computer-generated sensing data that may replace, correct, and/or adjust one or more faulty portions of the faulty data.

The vehicle control apparatus 301 may generate autonomous driving data by processing normal data and virtual data through the MUX, and transmit at least a part of the autonomous driving data to an autonomous driving controller 340 (e.g., the autonomous driving controller 140 of FIG. 1).

The vehicle control apparatus 301 may perform autonomous driving control on the host vehicle using at least one of the virtual data, the transmission data, or any combination thereof by using the autonomous driving controller 340. For example, if it is identified that at least a part of the autonomous driving data includes an error while the autonomous driving controller 340 is executing autonomous driving control, the vehicle control apparatus 301 may extract the corresponding data and transmit the corresponding data to the failure determination device 320. For example, the failure determination device 320 may determine whether a sensor associated with the corresponding data has failed using the transmitted data.

The vehicle control apparatus 301 may include a memory 350. For example, the memory 350 may store information related to the host vehicle including the vehicle control apparatus 301. For example, the memory 350 may encrypt vehicle information of the host vehicle and transmit the vehicle information to the communication device 330, the vehicle information of the host vehicle including the vehicle number, vehicle model, driving location, and driving speed of the host vehicle, the type of the failed sensor, sensor state information, sensor data information, the types of a plurality of sensors other than failed sensors, or any combination thereof. For example, the communication device 330 may transmit the information related to the host vehicle to the server 302.

Figure 4:
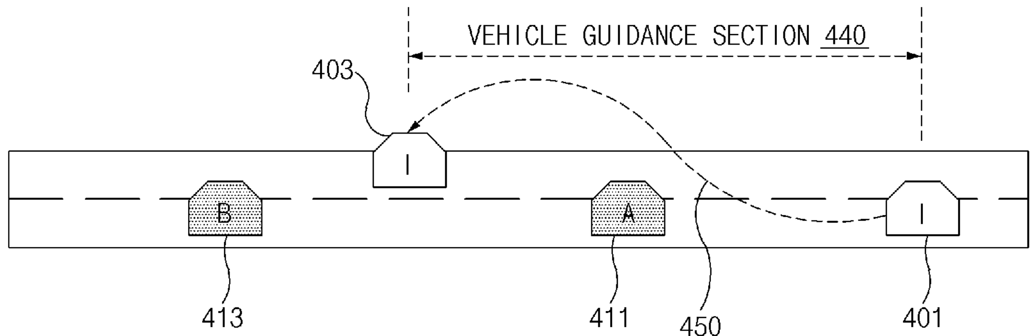
FIG. 4 is a conceptual diagram illustrating a vehicle guidance section.

FIG. 4 is a conceptual diagram illustrating a vehicle guidance section.

The host vehicle "I" may identify a failed sensor among a plurality of sensors at a first point 401. For example, the host vehicle "I" may identify that a specific sensor among a plurality of sensors is in a failure state while driving at the first point 401.

The host vehicle "I" may determine transmission data to be transmitted to a server using faulty data obtained by the failed sensor. For example, the host vehicle "I" may determine at least a part of normal data obtained by at least one sensor other than the failed sensor among the plurality of sensors as the transmission data based on the type of the failed sensor. For example, the host vehicle "I" may identify a related data list associated with the failed sensor and determine at least a part of normal data as transmission data by using at least one data type included in the related data list (e.g., retrieve normal data from a camera that is associated with a failed camera).

The host vehicle "I" may transmit virtual data to a server (e.g., the server 200 of FIG. 2) and receive the virtual data generated by the server in response to the transmission data.

The host vehicle "I" may perform autonomous driving control using at least one of the virtual data, the transmission data, or any combination thereof. For example, a section in which the host vehicle "I" performs autonomous driving control may be referred to as a vehicle guidance section 440 of FIG. 4.

The host vehicle "I" may further receive guidance position information from the server together with the virtual data. For example, the guidance position information may include information on a stop position 403 of the host vehicle "I".

The host vehicle "I" may perform autonomous driving control to allow the host vehicle to stop in a stop area including the stop position 403 of the host vehicle included in the guidance position information, by using one of the virtual data, the transmission data, the guidance position information, or any combination thereof. For example, the host vehicle "I" may perform autonomous driving control including a driving path and the stop position 403 during the vehicle guidance section 440 (e.g., moving from the first point 401 to the stop position 403 as shown in an arrow 450). Therefore, the host vehicle "I" may perform autonomous driving control of the host vehicle to avoid a dangerous situation with respect to vehicle A 411 and vehicle B 413 existing on an existing driving path and immediately stop at a safe place (e.g., stop position 403).

Figure 5:
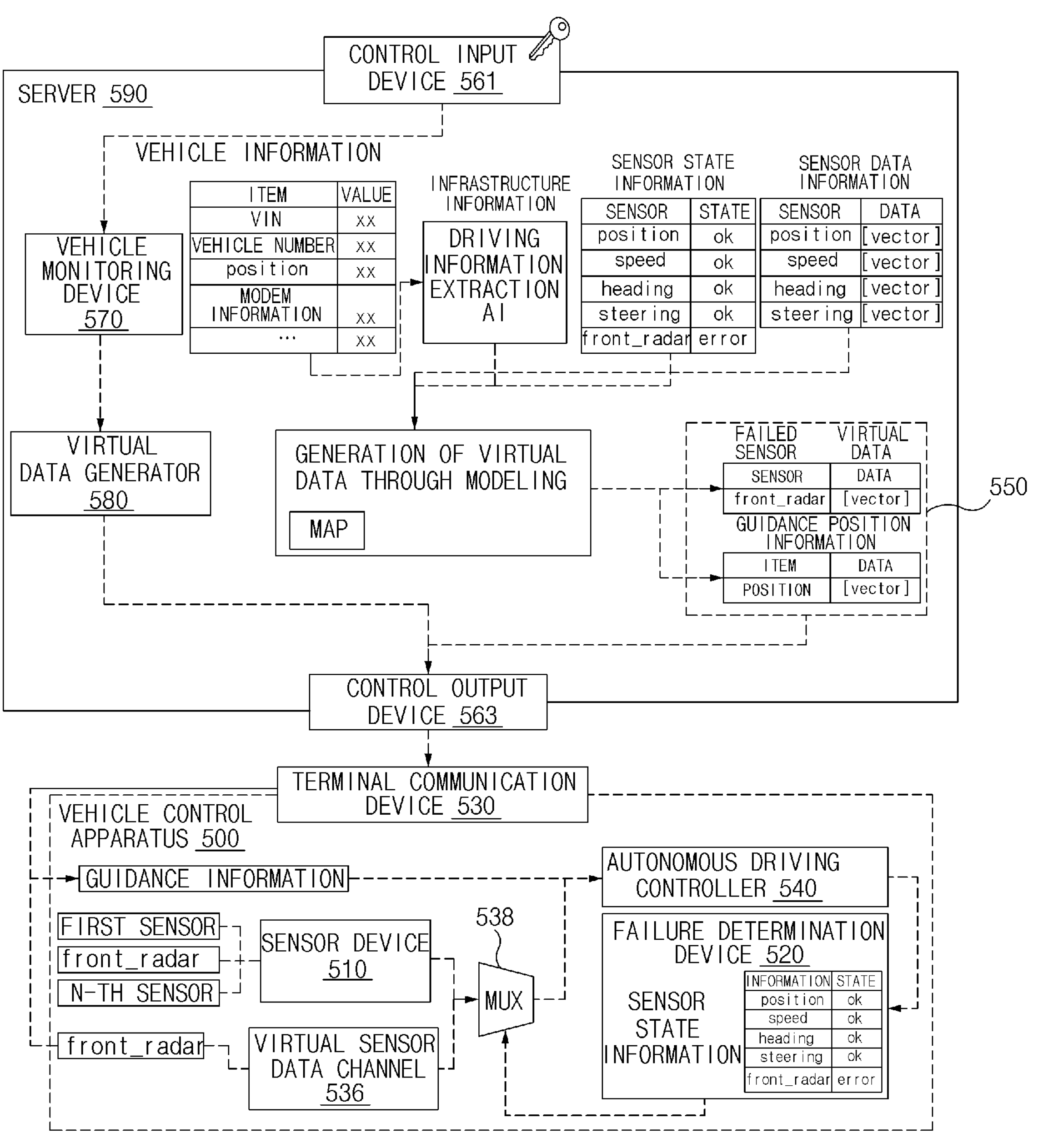
FIG. 5 is a conceptual diagram illustrating an operation between a vehicle control apparatus and a server.

FIG. 5 is a conceptual diagram illustrating an operation between a vehicle control apparatus and a server.

A vehicle control apparatus 500 (e.g., the vehicle control apparatus 100 of FIG. 1) and a server 590 (e.g., the server 200 of FIG. 2) may transmit and receive a variety of data to and from each other.

The vehicle control apparatus 500 may receive data transmitted from a control output device 563 (e.g., the control input/output device of FIG. 2) of the server 590 through a terminal communication device 530 (e.g., the communication device 130 of FIG. 1). For example, the transmitted data may include virtual data 550. In other words, the virtual data 550 may include guidance information and failed sensor virtual data (e.g., front_radar sensor's virtual data).

For example, the terminal communication device 530 may receive at least one of the guidance information (or guidance position information), front_radar information, or any combination thereof from the control output device 563.

For example, the front_radar information may include replacement data of faulty data obtained by the failed sensor among a plurality of sensors of the host vehicle. For example, the front_radar information may include replacement data of data obtained by a front radar sensor among a plurality of sensors included in a sensor device 510 (e.g., the sensor device 110 of FIG. 1) of the host vehicle. For example, the front_radar information may include data generated in such a way that the server 590 collects at least one of vehicle information of the host vehicle in which the vehicle control apparatus 500 is disposed, infrastructure information, sensor state information, sensor data information, or any combination thereof by using a vehicle monitoring device 570 (e.g., from a control input device 561) and generates the data based on at least a part of the collection result and map data. For example, the collection result may be based on sensing data collected by one or more RSUs and/or one or more other vehicles (e.g., via wireless communication, such as V2X/5G 391, etc.).

For example, the vehicle information may include one of a vehicle identification number (VIN), a vehicle number, a position, modem information of the host vehicle, or any combination thereof.

For example, the infrastructure information may include information (e.g., at least one of traffic conditions, nearby vehicle information, road conditions, weather information, or any combination thereof) received by the server 590 through various infrastructure facilities (e.g., at least one of the V2X/5G 391, the camera 393, the RSU 395, or any combination thereof in FIG. 3).

For example, the sensor state information may include information about the state of each of a plurality of sensors included in the host vehicle. For example, referring to FIG. 5, the position sensor, speed sensor, heading sensor, and steering sensor of the host vehicle may be referred to as being in a normal state. For example, referring to FIG. 5, the front radar sensor of the host vehicle may be referred to as being in a failure state. The server 590 may identify a failed sensor of the host vehicle by using the sensor state information.

For example, the sensor data information may include vector information of normal data other than the faulty data obtained by the failed sensor.

For example, the guidance information may include information about a stop position of the host vehicle. The guidance information may be information including a driving path of the host vehicle, which may be generated by the server 590 based on reception of transmission data from the vehicle control apparatus 500. For example, the guidance information may include guidance position information generated by the server 590 using a virtual data generator 580 (e.g., the virtual data modeling device 230 of FIG. 2). For example, the guidance information may include vector information associated with a stop position of the host vehicle.

For example, the server 590 may transmit at least a part of information collected and/or extracted through the vehicle monitoring device 570 to the virtual data generator 580.

For example, the virtual data generator 580 may generate the virtual data 550 (e.g., through modeling, machine-learning, deep learning, etc.). For example, the virtual data generator 580 may generate the virtual data 550 using at least one of information transmitted from the vehicle monitoring device 570, map information, or any combination thereof. The virtual data 550 may include failed sensor virtual data and guidance information (or guidance position information).

The vehicle control apparatus 500 may transmit at least a part of the received data to a virtual sensor data channel 536 (e.g., the virtual sensor data channel 336 of FIG. 3).

For example, the vehicle control apparatus 500 may transfer front_radar information (or failed sensor virtual data) to the virtual sensor data channel 536.

To communicate virtual data (e.g., when or before receiving virtual data including the front_radar information), the vehicle control apparatus 500 may establish the virtual sensor data channel 536 and transmit at least a part of the virtual data (e.g., front radar information) to a multiplexer 538 through the virtual sensor data channel 536.

The vehicle control apparatus 500 may generate autonomous driving data by processing, through the multiplexer 538, at least a part of the virtual data transmitted through the virtual sensor data channel 536 and normal data obtained using at least one sensor other than a failed sensor (e.g., front radar sensor) among a plurality of sensors, and transmit the at least a part of the autonomous driving data to an autonomous driving controller 540 (e.g., the autonomous driving controller 140 of FIG. 1).

The vehicle control apparatus 500 may perform autonomous driving control of the host vehicle using the autonomous driving controller 540. For example, the vehicle control apparatus 500 may perform autonomous driving control by at least partially using the failed sensor virtual data, which may be replacement data for faulty data obtained by a failed sensor (e.g., a front radar sensor) and normal data obtained by the remaining sensors. For example, the autonomous driving controller 540 may transmit a result of autonomous driving to a failure determination device 520. For example, when it is identified that at least a part of the autonomous driving data includes an error while the autonomous driving controller 540 is executing autonomous driving control, the vehicle control apparatus 500 may extract the corresponding data and transmit the corresponding data to the failure determination device 520. For example, the failure determination device 520 may repeatedly determine whether a sensor associated with the corresponding data has failed using the transmitted data. In at least some implementations, the vehicle control apparatus 500 may identify failure data (e.g., among data used by one or more sensors and/or parts of the vehicle), for example, while performing vehicle control using the autonomous driving controller 540. The identified failure data may be delivered to the failure determination device 520, for example, for determining whether a sensor associated with the corresponding data has failed using the transmitted data.

Figure 6:
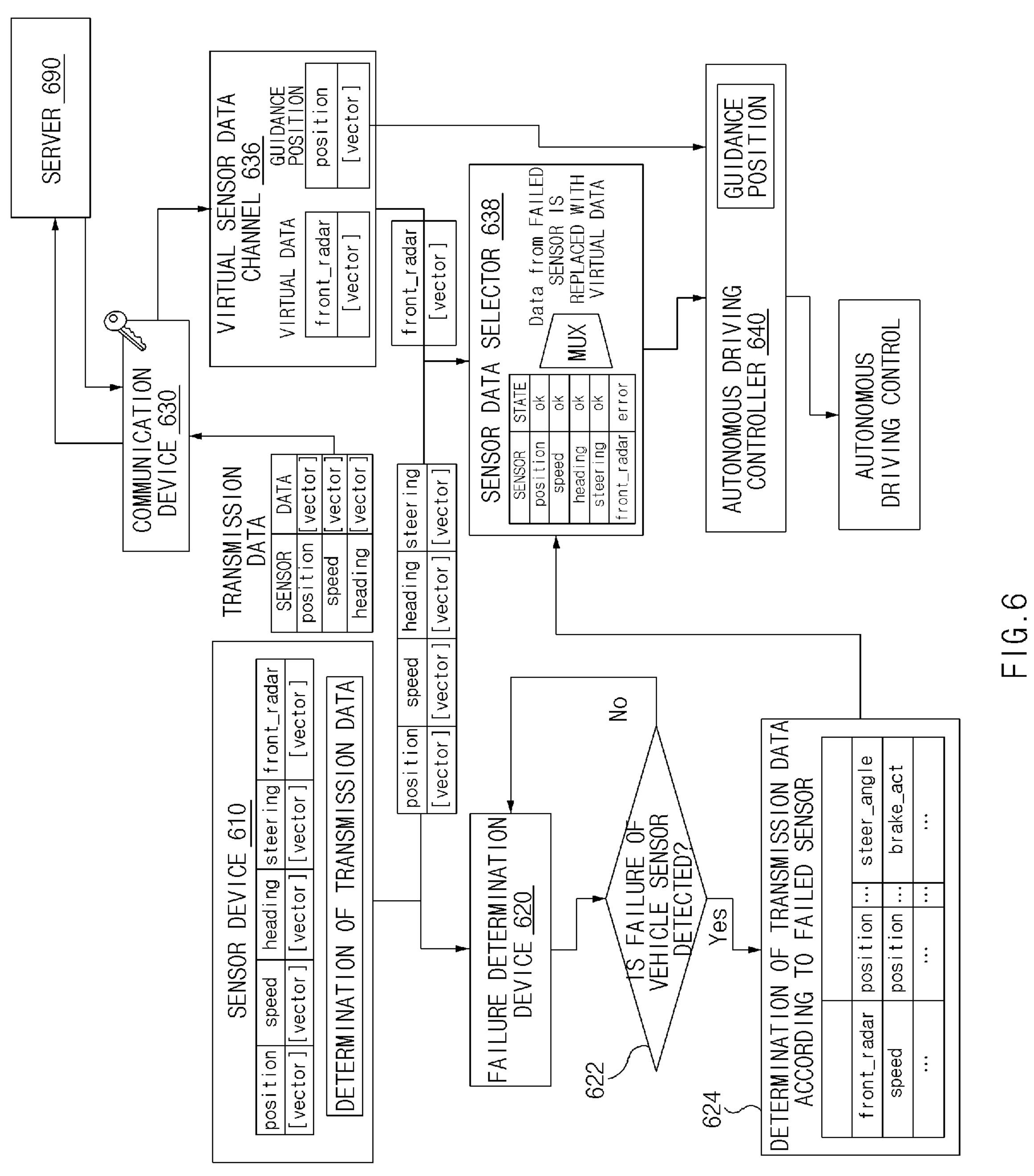
FIG. 6 is a conceptual diagram illustrating an operation of a vehicle control apparatus.

FIG. 6 is a conceptual diagram illustrating an operation of a vehicle control apparatus.

A vehicle control apparatus (e.g., the vehicle control apparatus 100 of FIG. 1) may include a sensor device 610 (e.g., the sensor device 110 of FIG. 1), a failure determination device 620 (e.g., the failure determination device 120 of FIG. 2), a communication device 630 (e.g., the communication device 130 of FIG. 1), and an autonomous driving controller 640 (e.g., the autonomous driving controller 140 of FIG. 1). The vehicle control apparatus may further include, for example, a virtual sensor data channel 636 (e.g., the virtual sensor data channel 336 of FIG. 3) and a sensor data selector 638.

The vehicle control apparatus may obtain a variety of data (e.g., position, speed, heading, steering, and front radar information) related to driving of a host vehicle by using a plurality of sensors included in the sensor device 610.

The vehicle control apparatus may detect faulty data among a variety of data (622). For example, the vehicle control apparatus may identify faulty data (e.g., front radar information) among a variety of data using the failure determination device 620 and identify, as a failed sensor (e.g., front radar sensor), a sensor which has obtained the faulty data.

The vehicle control apparatus may determine transmission data according to the failed sensor (624). For example, the vehicle control apparatus may determine, as the transmission data, at least a part of normal data obtained by at least one sensor other than the failed sensor among the plurality of sensors based on the type of the failed sensor. For example, a related data list associated with a failed sensor (e.g., a table in reference number 624) may be identified, and at least a part of normal data may be determined as transmission data by using at least one data type included in the related data list.

The vehicle control apparatus may transmit the transmission data to a server 690 through the communication device 630. For example, the vehicle control apparatus may encrypt data to be transmitted from the communication device 630 to the server 690 and transmit the data to the server 690.

The vehicle control apparatus may receive virtual data from the server 690. For example, the vehicle control apparatus may further receive guidance position information.

To receive virtual data, the vehicle control apparatus may establish the virtual sensor data channel 636 including a transmission and reception channel of the virtual data. For example, the vehicle control apparatus may transmit the virtual data to a multiplexer included in the sensor data selector 638 through a virtual sensor data channel.

The vehicle control apparatus may generate autonomous driving data for autonomous driving of the host vehicle using the sensor data selector 638. For example, the vehicle control apparatus may replace the faulty data obtained by a failed sensor with virtual data by using the sensor data selector 638. Accordingly, the vehicle control apparatus may generate autonomous driving data including virtual data without the faulty data using the sensor data selector 638. The sensor data selector 638 may transmit the generated autonomous driving data to the autonomous driving controller 640.

The vehicle control apparatus may perform autonomous driving control of the host vehicle using the autonomous driving controller 640. For example, the autonomous driving controller 640 may perform autonomous driving control using the virtual data transmitted from the sensor data selector 638 and guidance position information transmitted through the virtual sensor data channel 636. For example, the guidance position information may include information on a stop position of the host vehicle. For example, the autonomous driving controller 640 may perform autonomous driving control to allow the host vehicle to stop in a stop area including the stop position of the host vehicle included in the guidance position information, by using one of the virtual data, the transmission data, the guidance position information, or any combination thereof.

Figure 7:
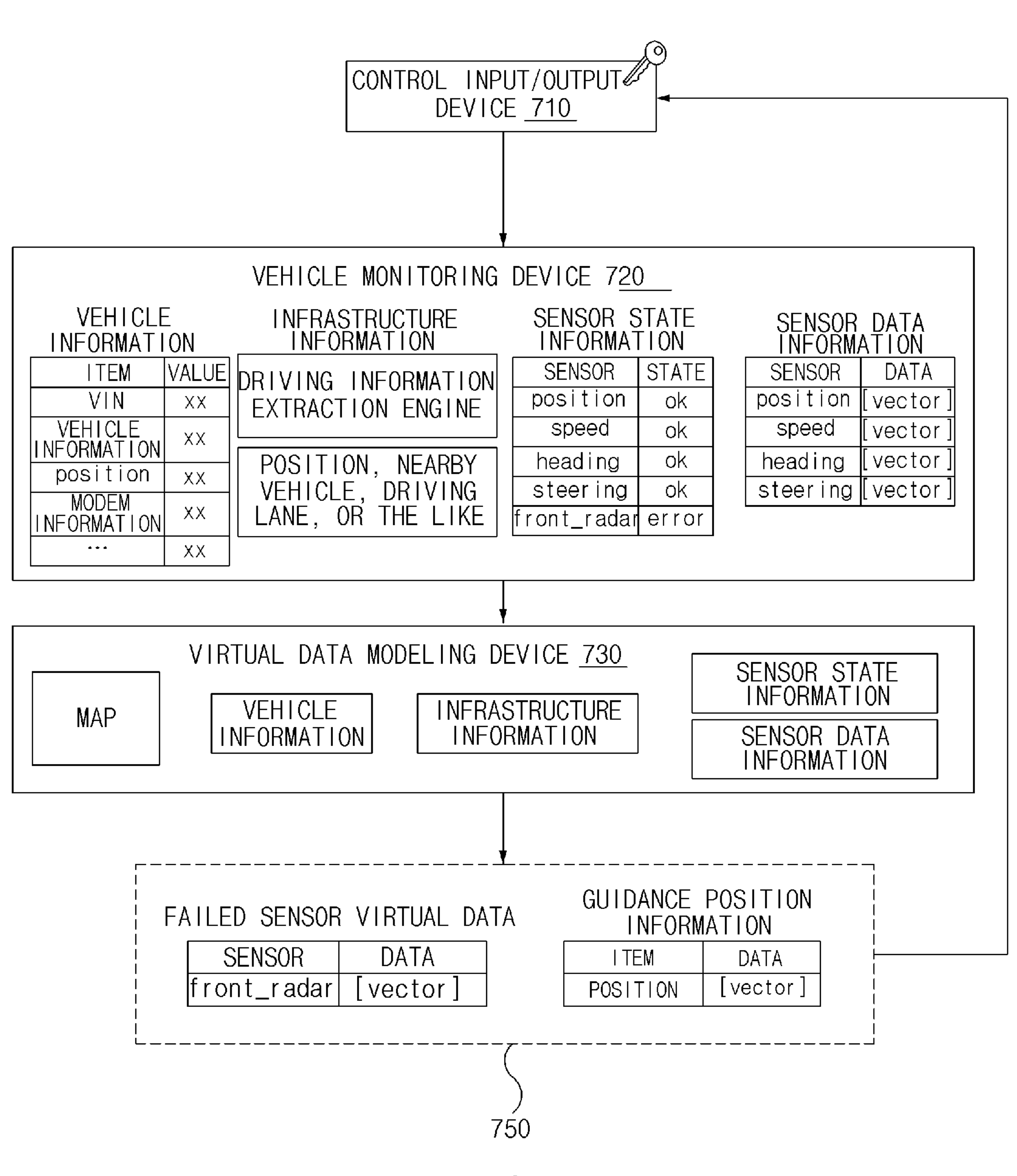
FIG. 7 is a conceptual diagram illustrating an operation of a server.

FIG. 7 is a conceptual diagram illustrating an operation of a server.

A server may include a control input/output device 710 (e.g., the control input/output device 210 of FIG. 2), a vehicle monitoring device 720 (e.g., the vehicle monitoring device 220 of FIG. 2), and a virtual data modeling device 730 (e.g., the virtual data modeling device 230 of FIG. 2).

The server may obtain a variety of data using the control input/output device 710. For example, the server may transmit and receive data to and from an external device (e.g., the vehicle control apparatus 100 of FIG. 1) using the control input/output device 710. For example, the server may transmit and receive data to and from an RSU (e.g., the RSU 395 of FIG. 3).

For example, the server may receive transmission data from the vehicle control apparatus using the control input/output device 710. For example, the server may receive, using the control input/output device 710, vehicle information of a host vehicle including the vehicle number, vehicle model, driving location, and driving speed of the host vehicle, the type of the failed sensor, sensor state information, sensor data information, the types of a plurality of sensors other than failed sensors, or any combination thereof.

For example, the server may receive infrastructure information including at least one of a driving lane or a driving position of the host vehicle, a nearby vehicle, or any combination thereof from at least one RSU using the control input/output device 710.

The server may obtain data (e.g., based on at preset periods) using the vehicle monitoring device 720. For example, the vehicle monitoring device 720 may obtain at least one of vehicle information of the host vehicle, infrastructure information, sensor state information, sensor data information, or any combination thereof through the control input/output device 710.

For example, the vehicle information may include one of a vehicle identification number (VIN), a vehicle number, a position, modem information of the host vehicle, or any combination thereof.

For example, the infrastructure information may include at least one of the position of the host vehicle, a nearby vehicle, a driving lane, or any combination thereof. For example, the vehicle monitoring device 720 may process the infrastructure information obtained through at least one RSU using a driving information extraction engine (or a driving information extraction artificial intelligence model). For example, based on collected data and based on artificial intelligence modeling, virtual data and/or guidance position information may be generated for a host vehicle.

For example, the sensor state information may include information about the state of each of a plurality of sensors included in the host vehicle. For example, referring to FIG. 7, the position sensor, speed sensor, heading sensor, and steering sensor of the host vehicle may be referred to as being in a normal state. For example, referring to FIG. 7, the front radar sensor of the host vehicle may be referred to as being in a failure state. The server may identify a failed sensor of the host vehicle by using the sensor state information.

For example, the sensor data information may include vector information of normal data other than the faulty data obtained by the failed sensor. For example, referring to FIG. 7, the sensor data information may separately include vector data obtained by a position sensor, vector data obtained by a speed sensor, vector data obtained by a heading sensor, and vector data obtained by a steering sensor. For example, referring to FIG. 7, the sensor data information may not include data obtained by a front radar sensor identified as being in a faulty state.

For example, the vehicle monitoring device 720 may transmit at least a part of the obtained information to the virtual data modeling device 730. For example, to generate virtual data 750 for autonomous driving control of a host vehicle, the vehicle monitoring device 720 may transmit at least a part of the obtained information to the virtual data modeling device 730 to allow the virtual data modeling device 730 to perform processing.

The virtual data modeling device 730 may generate the virtual data 750 using at least a part of the information transmitted from the vehicle monitoring device 720.

For example, the virtual data modeling device 730 may model (e.g., perform an artificial intelligence (AI) modelling process) the virtual data 750 using any one of map information, vehicle information, infrastructure information, sensor state information, sensor data information, or a combination thereof. The data may be modeled by one or more modeling systems (e.g., virtual data 750 may be processed by an AI modeling process, such as a learning process using an AI model, a machine learning model, a deep learning model, etc.).

For example, the virtual data 750 may include failed sensor virtual data. For example, the failed sensor virtual data may include replacement data for faulty data obtained by a failed sensor identified as being in a faulty state among a plurality of sensors of the host vehicle. For example, referring to FIG. 7, the failed sensor virtual data may include replacement data for front radar data obtained by a front radar sensor identified as a failed sensor.

For example, the virtual data 750 may include guidance position information. As an example, the guidance position information may include information on a stop position of the host vehicle and/or a position (or an area) in which the speed of the host vehicle is reduced below a threshold. As an example, the vehicle control apparatus may perform autonomous driving control for the host vehicle to stop in a stop area including a stop position included in the guidance position information based on reception of the guidance position information from the server.

The server may transmit at least a part of the virtual data 750 generated by the virtual data modeling device 730 to an external device (e.g., a vehicle control apparatus) through the control input/output device 710.

Figure 8:
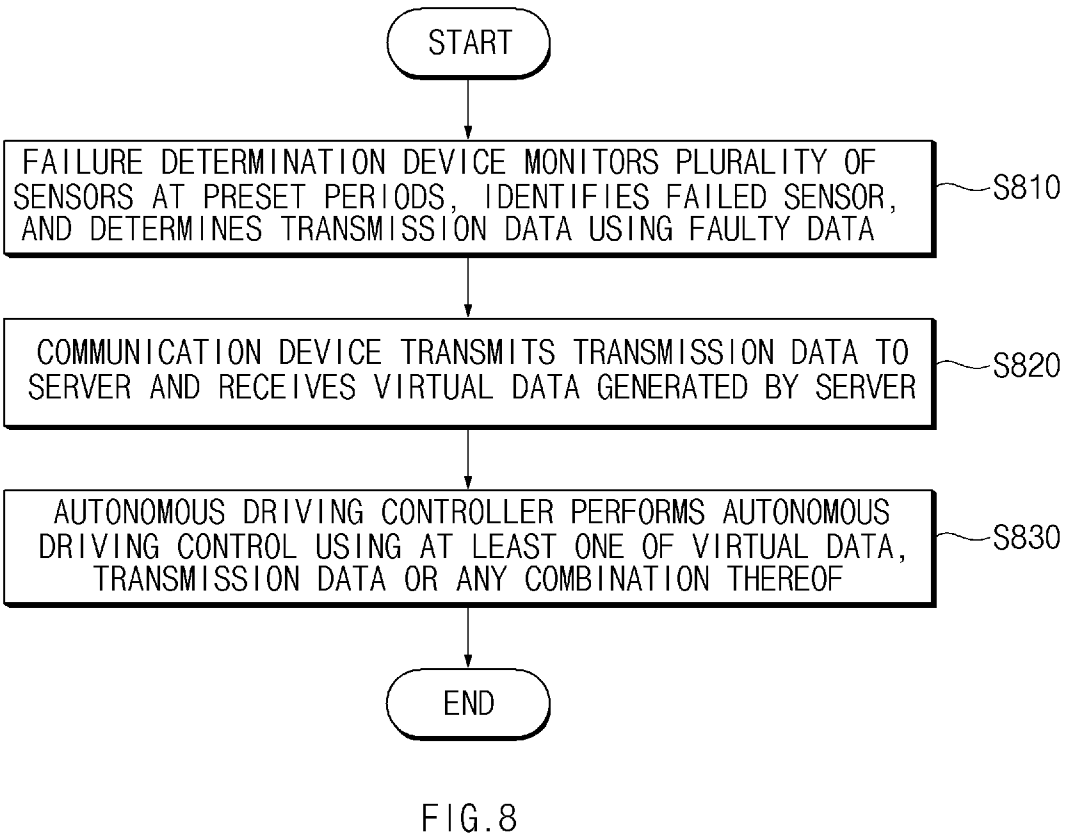
FIG. 8 is a flowchart of an operation of a vehicle control apparatus.

FIG. 8 is a flowchart of an operation of a vehicle control apparatus.

The vehicle control apparatus (e.g., the vehicle control apparatus 100 of FIG. 1) may perform operations shown in FIG. 8. For example, at least some of the components included in the vehicle control apparatus (e.g., the sensor device 110, the failure determination device 120, the communication device 130, and the autonomous driving controller 140 of FIG. 1) may set to perform the operations of FIG. 8.

Operations S810 to S830 may be performed sequentially, but are not necessarily sequentially performed. For example, the order of the operations may be changed, and at least two operations may be performed in parallel. One or more described features that corresponds to, or overlaps, the description with reference to contents of FIG. 8 will be briefly described or omitted.

The failure determination device may monitor a plurality of sensors (e.g., periodically, at preset periods), identify a failed sensor, and determine transmission data using faulty data (S810).

For example, the failure determination device may monitor the operating state of each of the plurality of sensors included in the vehicle control apparatus at preset periods and identify a failed state.

For example, the failure determination device may determine, as the transmission data, at least a part of normal data obtained by at least one sensor other than the failed sensor among the plurality of sensors based on the type of the failed sensor.

For example, the failure determination device may identify a related data list associated with the failed sensor and determine at least a part of normal data as transmission data by using at least one data type included in the related data list.

The communication device may transmit transmission data to a server (e.g., the server 200 of FIG. 2) and receive virtual data generated by the server (S820).

For example, the communication device may further receive guidance position information generated by the server, for example, based on or in response to the transmission data. The guidance position information may include, for example, information about a stop location of a host vehicle.

For example, to receive the virtual data (or when the virtual data is received), the communication device may establish a virtual sensor data channel including a transmission and reception channel of the virtual data, and transfer the virtual data to a multiplexer through the virtual sensor data channel. The multiplexer may generate autonomous driving data by processing the virtual data and normal data obtained using at least one sensor other than the failed sensor among the plurality of sensors.

The autonomous driving controller may perform autonomous driving control using at least one of the virtual data, the transmission data, or any combination thereof (S830).

For example, the autonomous driving controller may perform autonomous driving control to allow the host vehicle to stop in a stop area including the stop position of the host vehicle included in the guidance position information, by using one of the virtual data, the transmission data, the guidance position information, or any combination thereof.

For example, the autonomous driving controller may encrypt vehicle information of the host vehicle including the vehicle number, vehicle model, driving location, and driving speed of the host vehicle, the type of the failed sensor, sensor state information, sensor data information, the types of a plurality of sensors other than failed sensors, or any combination thereof. The autonomous driving controller may transmit encrypted data to the communication device and transmit the encrypted data to the server through the communication device.

For example, the autonomous driving controller may generate autonomous driving data by processing virtual data transmitted through a virtual sensor data channel and normal data obtained using at least one sensor other than the failed sensor among the plurality of sensors through the multiplexer, and perform autonomous driving based on at least a part of the autonomous driving data.

Figure 9:
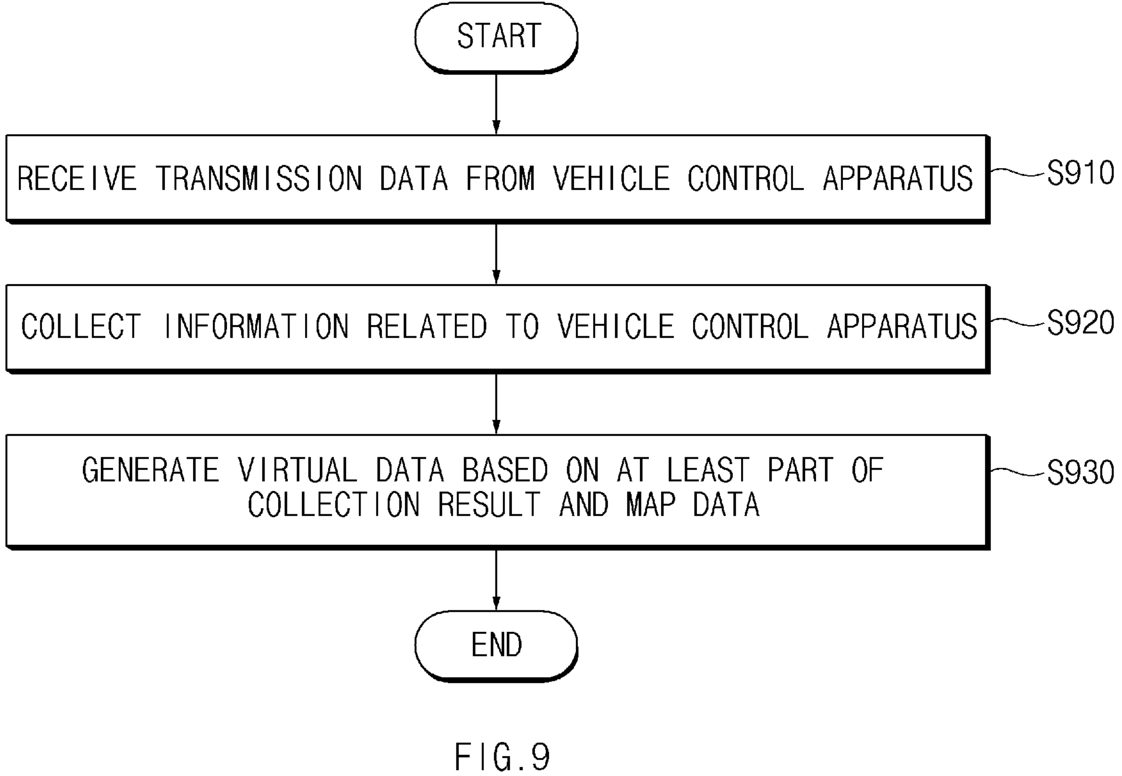
FIG. 9 is a flowchart illustrating an operation of a server.

FIG. 9 is a flowchart illustrating an operation of a server.

A server (e.g., the server 200 of FIG. 2) may perform operations shown in FIG. 9. For example, at least some of the components included in the server (e.g., the control input/output device 210, the vehicle monitoring device 220, and the virtual data modeling device 230 of FIG. 2) may be set to perform the operations of FIG. 9.

Operations S910 to S930 may be performed sequentially, but are not necessarily sequentially performed. For example, the order of the operations may be changed, and at least two operations may be performed in parallel. Also, one or more described features that corresponds to, or overlaps, the description with reference to FIG. 9 will be briefly described or omitted.

The server may receive transmission data from a vehicle control apparatus (e.g., the vehicle control apparatus 100 of FIG. 1) (S910).

For example, the server may receive the transmission data from the vehicle control apparatus through a control input/output device.

The server may collect information related to the vehicle control apparatus (S920).

For example, the server may collect information related to the vehicle control apparatus (or information related to a host vehicle) from the vehicle control apparatus and/or at least one RSU (e.g., the RSU 395 of FIG. 3) through the control input/output device.

For example, the server may receive vehicle information of a host vehicle including the vehicle number, vehicle model, driving location, and driving speed of the host vehicle, the type of the failed sensor, sensor state information, sensor data information, the types of a plurality of sensors other than failed sensors, or any combination thereof. The vehicle information may include, for example, information encrypted and transmitted by the vehicle control apparatus. The sensor state information may include, for example, information on whether each of a plurality of sensors included in the host vehicle has failed. The sensor data information may include, for example, at least one sensor data obtained by at least one sensor other than a failed sensor among the plurality of sensors.

For example, the server may receive infrastructure information including at least one of a driving lane or a driving position of the host vehicle, a nearby vehicle, or any combination thereof from at least one RSU using the vehicle information.

The server may generate virtual data based on at least a part of a collection result and map data (S930).

For example, the server may model a driving path of the host vehicle using vehicle information, sensor state information, sensor data information, infrastructure information, or any combination thereof, and generate virtual data associated with the failed sensor based on the result of the modeling.

For example, the server may generate guidance position information including information about a stop position of the host vehicle based on at least a part of the collection result and the map data, and transmit the virtual data and the guidance position information to the vehicle control apparatus.

For example, the server may transmit and receive data encrypted between the host vehicle equipped with the vehicle control apparatus and the server based on a predefined security system.

For example, the server may receive information on whether a plurality of sensors have failed at preset periods even after transmitting virtual data to the host vehicle using the control input/output device, and repeatedly generate virtual data.

Figure 10:
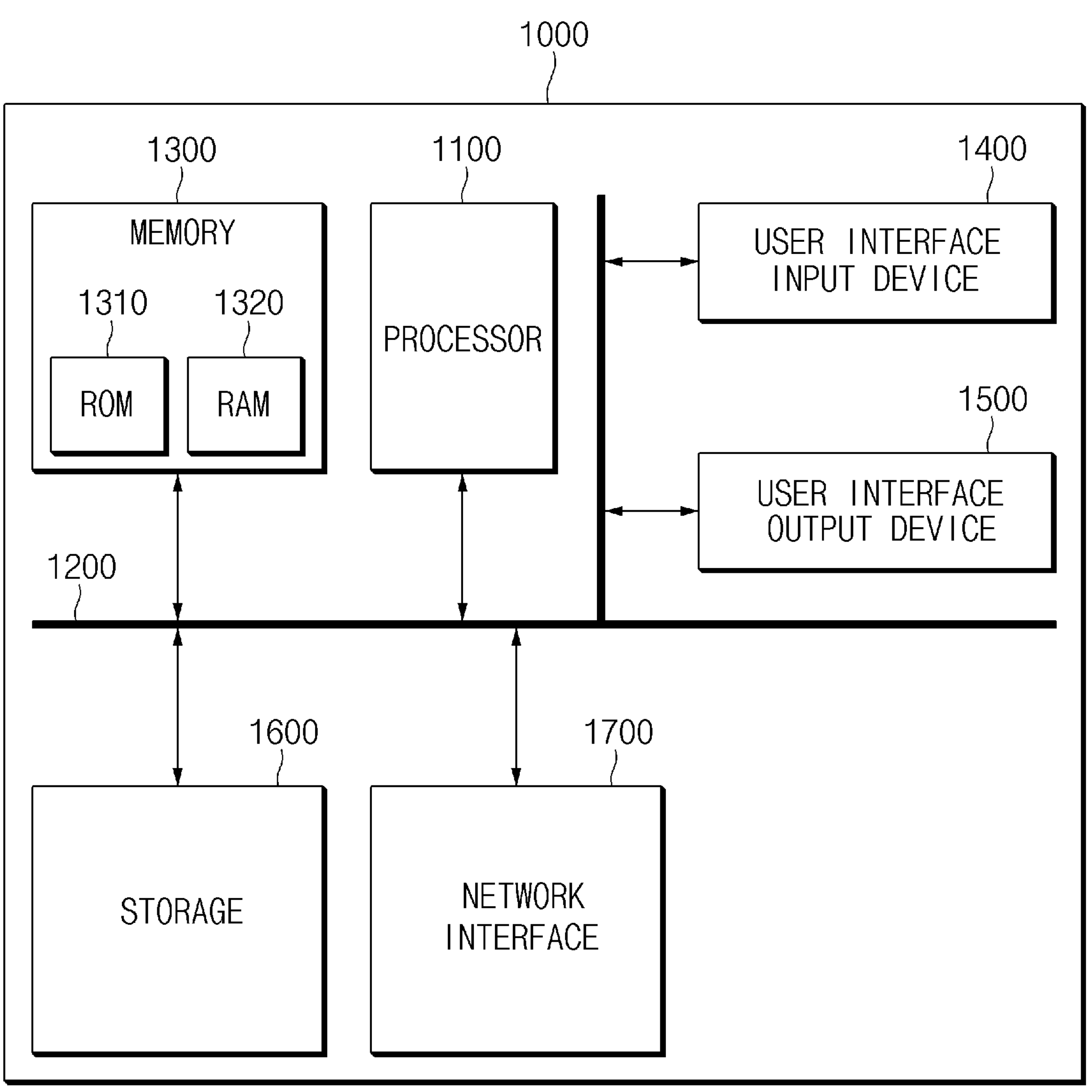
FIG. 10 illustrates a computing system.

FIG. 10 illustrates a computing system for a vehicle control method.

Referring to FIG. 10, a computing system 1000 for a vehicle control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the features disclosed herein may be embodied directly in hardware and/or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively or additionally, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

An aspect of the present disclosure provides a vehicle control apparatus which continuously monitors whether a plurality of sensors included in a sensor device is failed and adaptively receives data for continuity of autonomous driving control through communication with an external server when a failure occurs, a system including the same, and a method therefor.

Another aspect of the present disclosure provides a vehicle control apparatus which visually and/or audibly provides an alert alarm function for a situation in which a passenger remains, and provides an alarm function in various ways by further considering a separation distance between a host vehicle and a user, a system including the same, and a method therefor.

Still another aspect of the present disclosure provides a vehicle control apparatus which collects at least one of the information about a host vehicle, a user of the host vehicle, or any combination thereof using an information collector and appropriately identifies an action item using the collected information, a system including the same, and a method therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus includes a sensor device including a plurality of sensors, a failure determination device that monitors the plurality of sensors at preset periods, identifies a failed sensor among the plurality of sensors, and determines transmission data to be transmitted to a server using faulty data obtained by the failed sensor, a communication device that transmits the transmission data to the server and receives virtual data generated by the server in correspondence with the transmission data from the server, and an autonomous driving controller that performs autonomous driving control for a host vehicle using at least one of the virtual data, the transmission data, or any combination thereof.

According to an embodiment, the communication device may receive guidance position information generated by the server in correspondence with the transmission data from the server. For example, the guidance position information may include information on a stop position of the host vehicle.

According to an embodiment, the autonomous driving controller may perform the autonomous driving control to allow the host vehicle to stop in a stop area including the stop position of the host vehicle included in the guidance position information using one of the virtual data, the transmission data, the guidance position information, or any combination thereof.

According to an embodiment, the autonomous driving controller may encrypt vehicle information of the host vehicle including a vehicle number, a vehicle model, a driving position, and a driving speed of the host vehicle, a type of the failed sensor, sensor state information, sensor data information, types of the plurality of sensors other than the failed sensor, or any combination thereof. For example, the communication device may transmit the encrypted vehicle information to the server.

According to an embodiment, the failure determination device may determine at least a part of normal data obtained by at least one sensor other than the failed sensor among the plurality of sensors as the transmission data based on the type of the failed sensor.

According to an embodiment, the failure determination device may identify a related data list associated with the failed sensor and determine the at least a part of normal data as the transmission data by using at least one data type included in the related data list.

According to an embodiment, the communication device may establish a virtual sensor data channel including a transmission and reception channel of the virtual data, and transmit the virtual data to a multiplexer through the virtual sensor data channel, when the virtual data is received.

According to an embodiment, the autonomous driving controller may generate autonomous driving data by processing the virtual data transmitted through the virtual sensor data channel and normal data obtained using at least one sensor other than the failed sensor among the plurality of sensors through the multiplexer, and perform the autonomous driving based on at least a part of the autonomous driving data.

According to an aspect of the present disclosure, a vehicle control system includes a vehicle control apparatus that monitors a plurality of sensors at preset periods, identifies a failed sensor among the plurality of sensors, and transmits transmission data determined using faulty data obtained by the failed sensor to a server and the server that collects at least one of vehicle information of a host vehicle equipped with the vehicle control apparatus, sensor state information, sensor data information, or any combination thereof, generates virtual data based on at least a part of a collection result and map data, and transmits the virtual data to the vehicle control apparatus, based on reception of the transmission data.

According to an embodiment, the server may receive infrastructure information including at least one of a driving lane or a driving position of the host vehicle, a nearby vehicle, or any combination thereof from at least one RSU using the vehicle information, model a driving path of the host vehicle using the vehicle information, the sensor state information, the sensor data information, the infrastructure information, or any combination thereof, and generate the virtual data associated with the failed sensor based on a result of the modeling.

According to an embodiment, the server may transmit and receive encrypted data to and from the host vehicle based on a predefined security system between the server and the host vehicle equipped with the vehicle control apparatus.

According to an embodiment, the server may generate guidance position information including information about a stop position of the host vehicle based on at least a part of the collection result and the map data, and transmit the virtual data and the guidance position information to the vehicle control apparatus.

According to an embodiment, the sensor state information may include information on whether each of the plurality of sensors included in the host vehicle is failed.

According to an embodiment, the sensor data information may include at least one sensor data obtained by at least one sensor other than the failed sensor among the plurality of sensors.

According to an embodiment, the vehicle control apparatus may generate autonomous driving data by processing the virtual data received from the server and normal data obtained using at least one sensor other than the failed sensor among the plurality of sensors through a multiplexer. For example, the vehicle control apparatus may perform the autonomous driving based on at least a part of the autonomous driving data.

According to an embodiment, the vehicle control apparatus may encrypt vehicle information of the host vehicle including a vehicle number, a vehicle model, a driving position, and a driving speed of the host vehicle, a type of the failed sensor, the sensor state information, the sensor data information, types of the plurality of sensors other than failed sensor, or any combination thereof and transmit the encrypted information to the server.

According to an aspect of the present disclosure, a vehicle control method includes monitoring, by a failure determination device, a plurality of sensors included in a sensor device at preset periods, identifying a failed sensor among the plurality of sensors, and determining transmission data to be transmitted to a server using faulty data obtained by the failed sensor, transmitting, by a communication device, the transmission data to the server and receiving virtual data generated by the server in correspondence with the transmission data, and performing, by an autonomous driving controller, autonomous driving control for a host vehicle using at least one of the virtual data, the transmission data, or any combination thereof.

According to an embodiment, the receiving, by the communication device, the virtual data may include receiving, by the communication device, guidance position information including information on a stop position of the host vehicle from the server in response to transmission of the transmission data. For example, the performing, by the autonomous driving controller, the autonomous driving control may include performing, by the autonomous driving controller, the autonomous driving control to allow the host vehicle to stop in a stop area including the stop position of the host vehicle included in the guidance position information using one of the virtual data, the transmission data, the guidance position information, or any combination thereof.

According to an embodiment, the transmitting, by the communication device, the transmission data may include encrypting, by the autonomous driving controller, vehicle information of the host vehicle including a vehicle number, a vehicle model, a driving position, and a driving speed of the host vehicle, a type of the failed sensor, sensor state information, sensor data information, types of the plurality of sensors other than failed sensor, or any combination thereof, and transmitting, by the communication device, the encrypted vehicle data to the server.

According to an embodiment, the determining, by the failure determination device, the transmission data may include determining, by the failure determination device, as the transmission data, at least a part of normal data obtained by at least one sensor other than the failed sensor among the plurality of sensors by using at least one data type included in a related data list associated with the failed sensor.

According to an embodiment, the receiving, by the communication device, the virtual data may include establishing, by the communication device, a virtual sensor data channel including a transmission and reception channel of the virtual data, and transfer the virtual data to a multiplexer through the virtual sensor data channel, when the virtual data is received, and generating, by the autonomous driving controller, autonomous driving data by processing the virtual data received from the server and normal data obtained using at least one sensor other than the failed sensor among the plurality of sensors through the multiplexer.

According to an embodiment, the performing, by the autonomous driving controller, the autonomous driving control may include performing, by the autonomous driving controller, the autonomous driving based on at least a part of the autonomous driving data.

The above description is merely illustrative of the technical idea of the present disclosure, and various modifications and variations may be made without departing from the essential characteristics of the present disclosure by those skilled in the art to which the present disclosure pertains.

Accordingly, various examples disclosed in the present disclosure are not intended to limit the technical idea of the present disclosure but to describe the present disclosure, and the scope of the technical idea of the present disclosure is not limited by the illustrated examples. The scope of protection of the present disclosure should be interpreted by the following claims, and all technical ideas within the scope equivalent thereto should be construed as being included in the scope of the present disclosure.

Exemplary advantageous effects of the vehicle control apparatus, the system including the same, and the vehicle control method according to the present disclosure are given as follows.

According to at least some aspects of the present disclosure, when at least one sensor does not operate normally, it is possible to provide convenience of continuity of autonomous driving control of the vehicle being maintained through immediate establishment of communication with the server.

In addition, according to at least some aspects of the present disclosure, when at least one sensor does not operate normally, usability of moving the vehicle to a safe area and stopping the vehicle without performing additional operation logic may be provided.

In addition, according to at least some aspects of the present disclosure, it is possible to provide a more rapid and accurate autonomous driving control function in a dangerous situation by collecting vehicle-related information using any one of a road side unit (RSU), a camera, a traffic light, or a combination thereof, and providing a driving path of the vehicle.

In addition, various effects may be provided that are directly or indirectly understood through the disclosure.

Hereinabove, although the present disclosure has been described with reference to various examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control apparatus, comprising:

a sensor device comprising a plurality of sensors;

a processor circuit configured to monitor the plurality of sensors, identify a failed sensor among the plurality of sensors, and determine, based on faulty data obtained by the failed sensor, transmission data, wherein the processor circuit is configured to determine, based on a type of the failed sensor, at least a part of normal data obtained by at least one sensor other than the failed sensor among the plurality of sensors as the transmission data;

a communication device configured to transmit the transmission data to a server and receive, from the server, virtual data associated with the transmission data, wherein the virtual data is associated with the type of the failed sensor; and an autonomous driving controller configured to perform autonomous driving control, for a vehicle, using:

the faulty data;

the virtual data associated with the type of the failed sensor;

additional sensing data obtained by the failed sensor; and additional sensing data obtained by the at least one sensor other than the failed sensor.

2. The vehicle control apparatus of claim 1, wherein the communication device is configured to receive, from the server, guidance position information associated with the transmission data, and wherein the guidance position information comprises information on a stop position of the vehicle.

3. The vehicle control apparatus of claim 2, wherein the autonomous driving controller is configured to perform the autonomous driving control, to allow the vehicle to stop in a stop area comprising the stop position of the vehicle, using at least one of: the virtual data, the transmission data, or the guidance position information.

4. The vehicle control apparatus of claim 1, wherein the autonomous driving controller is configured to encrypt vehicle information of the vehicle, wherein the vehicle information comprises at least one of: a vehicle number, a vehicle model, a driving position, a driving speed of the vehicle, the type of the failed sensor, sensor state information, sensor data information, or types of the plurality of sensors other than the failed sensor, and wherein the communication device is configured to transmit the encrypted vehicle information to the server.

5. The vehicle control apparatus of claim 1, wherein the processor circuit is configured to:

identify a related data list associated with the failed sensor; and determine, by using at least one data type included in the related data list, the at least a part of normal data as the transmission data.

6. The vehicle control apparatus of claim 1, wherein the communication device is configured to:

establish a virtual sensor data channel for communicating the virtual data, and transmit the virtual data to a multiplexer through the virtual sensor data channel.

7. The vehicle control apparatus of claim 6, wherein the autonomous driving controller is configured to:

generate autonomous driving data by processing an output of the multiplexer, wherein the output of the multiplexer comprises the virtual data transmitted through the virtual sensor data channel and normal data, and wherein the normal data is obtained using at least one sensor other than the failed sensor among the plurality of sensors, and perform, based on at least a part of the autonomous driving data, the autonomous driving control.

8. The vehicle control apparatus of claim 1, wherein the processor circuit is configured to determine the transmission data by:

selectively extracting, based on the type of the failed sensor, at least a part of normal data of at least one sensor, of the vehicle, other than the failed sensor.

9. A vehicle control system, comprising:

a vehicle control apparatus comprising a processor circuit and configured to monitor a plurality of sensors, identify a failed sensor among the plurality of sensors, and transmit transmission data, wherein the transmission data is determined based on faulty data obtained by the failed sensor, and wherein the vehicle control apparatus is configured to determine, based on a type of the failed sensor, at least a part of normal data obtained by at least one sensor other than the failed sensor among the plurality of sensors as the transmission data; and a computing device configured to:

collect at least one of: vehicle information of a vehicle equipped with the vehicle control apparatus, sensor state information, or sensor data information;

generate, based on at least a part of the collection and map data, virtual data, wherein the virtual data is associated with the type of the failed sensor; and transmit, based on reception of the transmission data, the virtual data to the vehicle control apparatus, wherein the vehicle control apparatus is further configured to perform autonomous driving control, for the vehicle, using:

the faulty data;

the virtual data associated with the type of the failed sensor;

additional sensing data obtained by the failed sensor; and additional sensing data obtained by the at least one sensor other than the failed sensor.

10. The vehicle control system of claim 9, wherein the computing device is configured to:

receive, from at least one road side unit using the vehicle information, infrastructure information comprising at least one of: a driving lane of the vehicle, a driving position of the vehicle, or a nearby vehicle, determine a driving path of the vehicle using the infrastructure information and the at least one of: the vehicle information, the sensor state information, or the sensor data information, and generate, based on the determined driving path, the virtual data associated with the failed sensor.

11. The vehicle control system of claim 9, wherein the computing device is configured to transmit and receive encrypted data to and from the vehicle based on a security system.

12. The vehicle control system of claim 9, wherein the computing device is configured to:

generate guidance position information comprising information about a stop position of the vehicle, and wherein the guidance position information is generated based on at least a part of the collection and the map data; and transmit, to the vehicle control apparatus, the virtual data and the guidance position information.

13. The vehicle control system of claim 9, wherein the sensor state information comprises information on whether at least one of the plurality of sensors comprised in the vehicle is failed, and wherein the sensor data information comprises at least one sensor data obtained by at least one sensor other than the failed sensor among the plurality of sensors.

14. The vehicle control system of claim 9, wherein the vehicle control apparatus is configured to:

generate autonomous driving data by processing an output of a multiplexer, wherein the output of the multiplexer comprises the virtual data and normal data obtained using at least one sensor other than the failed sensor among the plurality of sensors; and perform, based on at least a part of the autonomous driving data, autonomous driving control for the vehicle.

15. The vehicle control system of claim 9, wherein the vehicle control apparatus is configured to:

encrypt the vehicle information of the vehicle, wherein the vehicle information comprises a vehicle number, a vehicle model, a driving position, a driving speed of the vehicle, the type of the failed sensor, the sensor state information, the sensor data information, or types of the plurality of sensors other than failed sensor; and transmit the encrypted vehicle information to the computing device.

16. A vehicle control method, comprising:

monitoring, by a vehicle control apparatus, a plurality of sensors;

identifying, by the vehicle control apparatus, a failed sensor among the plurality of sensors;

determining, by the vehicle control apparatus and based on faulty data obtained by the failed sensor, transmission data, wherein the determining the transmission data comprises: by using at least one data type comprised in a related data list associated with the failed sensor, determining, as the transmission data, at least a part of normal data obtained by at least one sensor other than the failed sensor among the plurality of sensors;

transmitting, by the vehicle control apparatus, the transmission data to a computing device;

receiving, by the vehicle control apparatus and from the computing device, virtual data associated with the transmission data, wherein the virtual data is associated with a type of the failed sensor; and performing, by the vehicle control apparatus, autonomous driving control, for a vehicle, using:

the faulty data;

the virtual data associated with the type of the failed sensor;

additional sensing data obtained by the failed sensor; and additional sensing data obtained by the at least one sensor other than the failed sensor.

17. The vehicle control method of claim 16, wherein the receiving the virtual data comprises receiving, by a communication device, guidance position information comprising information on a stop position of the vehicle in response to transmission of the transmission data, and wherein the performing the autonomous driving control comprises performing, by an autonomous driving controller, the autonomous driving control, to allow the vehicle to stop in a stop area comprising the stop position of the vehicle, using at least one of: the virtual data, the transmission data, or the guidance position information.

18. The method of claim 16, wherein the transmitting the transmission data comprises:

encrypting, by an autonomous driving controller, vehicle information of the vehicle, wherein the vehicle information comprises a vehicle number, a vehicle model, a driving position, a driving speed of the vehicle, a type of the failed sensor, sensor state information, sensor data information, or types of the plurality of sensors other than failed sensor, and transmitting, by a communication device, the encrypted vehicle information to the computing device.

19. The vehicle control method of claim 16, wherein the receiving the virtual data comprises:

establishing, by a communication device, a virtual sensor data channel for communicating the virtual data, transferring the virtual data to a multiplexer through the virtual sensor data channel, and generating, by an autonomous driving controller, autonomous driving data by processing an output of the multiplexer, wherein the output of the multiplexer comprises the virtual data and normal data obtained using at least one sensor other than the failed sensor among the plurality of sensors, and wherein the performing the autonomous driving control comprises performing, by the autonomous driving controller and based on at least a part of the autonomous driving data, the autonomous driving control.

20. The vehicle control method of claim 16, wherein the determining the transmission data comprises:

selectively extracting, based on the at least one data type, at least a part of normal data of at least one sensor, of the vehicle, other than the failed sensor.

* * * * *